Oct. 11, 1966  R. E. WEST  3,278,034
FILTER TANK AND VALVE ASSEMBLY
Filed April 13, 1964
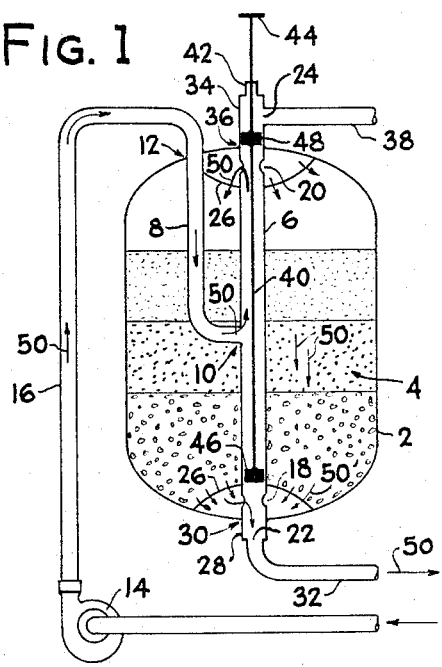
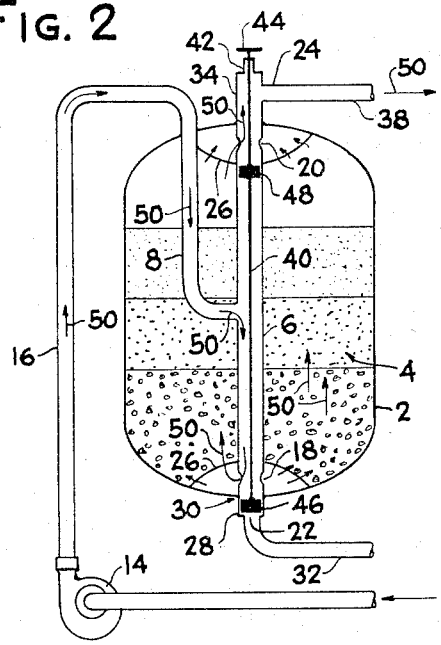
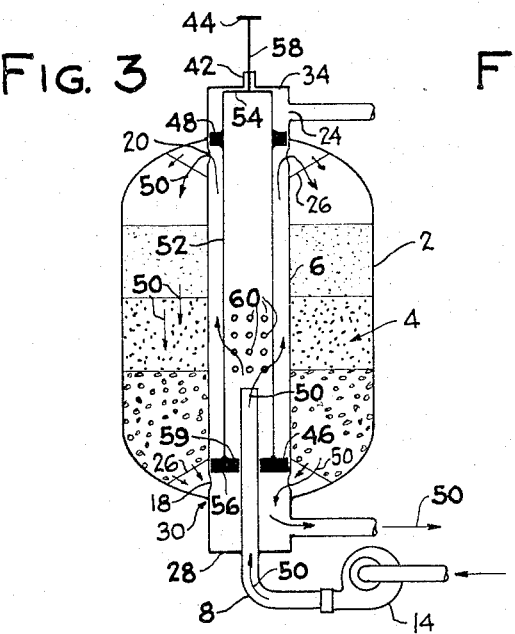
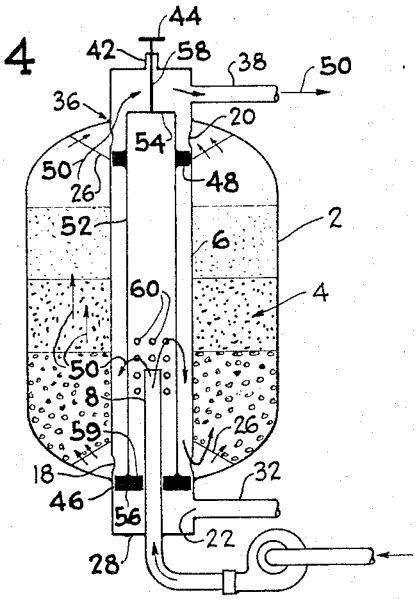
ROBERT E. WEST
*INVENTOR.*
BY *Albert Sperry*
ATTORNEY

United States Patent Office 3,278,034
Patented Oct. 11, 1966

3,278,034
FILTER TANK AND VALVE ASSEMBLY
Robert E. West, Yardley, Pa., assignor to Cascade Industries, Incorporated, Edison, N.J.
Filed Apr. 13, 1964, Ser. No. 359,117
4 Claims. (Cl. 210—287)

This invention relates to washable filters and is particularly directed to washable filters for use in connection with swimming pools and the like.

As is well known, the water in swimming pools must be changed frequently in order to remove dirt, sediment, algae and the like. However, because of the relatively large volume of water involved, it is generally impractical to provide a continuous source of completely fresh water. Instead, it is the usual practice to provide a recirculating system including filtering means whereby water may be drained from the swimming pool, passed through the filtering means, and returned to the swimming pool. Unfortunately, the filters employed for this purpose become clogged or contaminated from time to time with the material removed from the water so that it is necessary periodically to clean or purge the filter to remove the contaminating material for discharge into a drain or sewer.

One of the most satisfactory types of such filter comprises a tank containing a filter bed having a plurality of layers of gravel, course sand, fine sand and the like which serves to remove contaminating matter from water passed therethrough in a predetermined direction. In order to clean the filter, water is forced, under pressure, through the filter bed in a reverse direction, causing the material of the filter bed to be vigorously agitated to remove foreign matter entrapped therein and to restore the filter bed to its original condition.

To control the direction of flow of water through the filter bed, it is common practice to employ a slide valve comprising a cylinder and having a pair of piston type valve members mounted in spaced relation on a control shaft which is actuable to move the piston type valve members between selected positions within the cylinder. An inlet port is formed in the cylinder intermediate the two piston type valve members and four outlet ports are provided, two adjacent each end of the cylinder. It has been the practice heretofore to mount the slide valve cylinder adjacent the filter tank and to connect the pump to deliver water to the inlet port of the cylinder. One of the outlet ports is connected by suitable pipes to the upper end of the filter tank. A second one of the outlet ports is connected by suitable pipes to the lower end of the filter tank. A third outlet port is connected to the drain or sewer while the fourth outlet port is connected to the swimming pool.

It will be seen that, with this arrangement, seven external connections must be made; between the pump and the inlet port of the valve cylinder; between the first outlet port and a first pipe; between the first pipe and the upper end of the filter tank; between the lower end of the filter tank and a second pipe; between the second pipe and a second outlet port of the valve cylinder; between a third outlet port of the valve cylinder and the drain or sewer; and between the fourth outlet port of the valve cylinder and the swimming pool. Unfortunately, each of these external connections is a source of possible leakage and, if not made properly watertight, could cause expensive loss of water, damage to the pump, or failure of the entire system. Thus, skilled plumbers are required to install the system. Moreover, even when properly made, the packing or other material used to seal the connections may deteriorate in time so that periodic inspections must be made of each connection to discover leaks which might occur subsequent to installation of the system. Consequently, the cost of installing and maintaining such systems has heretofore been quite expensive.

These disadvantages of prior art filtration systems are overcome with the present invention and novel means is provided which require only three external connections. Consequently, the expense of installation and maintenance are significantly reduced and the danger of leakage is greatly lessened.

The advantages of the present invention are preferably attained by providing a novel filter tank having a slide valve cylinder mounted concentrically within the filter tank and attached thereto in a permanent and completely leakproof manner during manufacture of the novel filter tank. With this arrangement, the only external connections required are between the pump and a suitable inlet port of the novel filter tank; between one outlet port of the novel filter tank and the swimming pool; and between a second outlet port of the novel filter tank and the drain or sewer. Moreover, the novel filter tank and valve assembly of the present invention is extremely compact. Consequently, the expense of labor and material in providing a shelter pit or housing is much less with the assembly of the present invention than with the devices of the prior art.

Accordingly, it is an object of the present invention to provide a novel filter tank and slide valve assembly.

Another object of the present invention is to provide a novel filter tank and slide valve assembly which greatly lessens the danger of leakage and significantly reduces the costs of installation and maintenance.

A further object of the present invention is to provide a novel filter tank and slide valve assembly which is extremely compact.

A specific object of the present invention is to provide a novel filter tank and slide valve assembly comprising a filter tank, and a slide valve mounted concentrically within said tank and attached to said tank in a permanent and leakproof manner.

These and other objects and features of the present invention will be apparent from the following detailed description taken with reference to the figures of the accompanying drawing.

In the drawing:

FIG. 1 is a diagrammatic representation, partly in section, showing a filtering system embodying the filter tank and valve assembly of the present invention during a filtering cycle;

FIG. 2 is a view, similar to that of FIG. 1, showing the filtering system of FIG. 1 during a wash cycle;

FIG. 3 is a view, similar to that of FIG. 1, showing an alternative form of the filter tank and valve assembly of the present invention during a filtering cycle; and FIG. 4 is a view, similar to that of FIG. 2, showing the filter tank and valve assembly of FIG. 3 during a wash cycle.

In the form of the present invention illustrated in FIG. 1, a filtering system is shown having a generally cylindrical filter tank 2 containing a filter bed indicated at 4 composed of a plurality of respective layers of fine sand, course sand, and gravel, or other suitable filtering material. A slide valve cylinder 6 is concentrically mounted within the filter tank 2 and is provided with an inlet pipe 8 which is connected to the valve cylinder 6, as indicated at 10, and extends through an opening in the filter tank 2, as indicated at 12. A pump 14 is connected by a suitable pipe 16 to the inlet pipe 8 to deliver water through inlet pipe 8 and valve cylinder 6 to the filter bed 4. Valve cylinder 6 is also provided with four outlet ports 18, 20, 22 and 24. Outlet ports 18 and 20 communicate with the interior of filter tank 2 and are preferably covered by screens 26 or the like to prevent foreign matter from passing into or out of the valve cylinder 6.

The lower end 28 of valve cylinder 6 extends through the bottom of filter tank 2, as shown at 30, and outlet port 22 is formed in the lower end 28 of valve cylinder 6 and is connected, as by pipe 32, to allow water to pass between the filter tank 2 and the swimming pool, not shown. The upper end 34 of valve cylinder 6 extends through the top of filter tank 2, as shown at 36, and outlet port 24 is formed in the upper end 34 of valve cylinder 6 and is connected, as by pipe 38, to deliver water from the filter tank 2 to a drain or sewer, not shown.

The connections, shown at 10 and 12, of the inlet pipe 8 with the valve cylinder 6 and the filter tank 2, respectively, and the connections, shown at 30 and 36, between the valve cylinder 6 and the filter tank 2 are all permanent, watertight connections which may be made during manufacture of the filter tank and valve assembly by welding or the like. In this way, the possibility of leakage from these connections is precluded and these connections will not be need to be made or inspected by a plumber during installation of the system or during subsequent maintenance thereof. The only connections with which a plumber need be concerned are those between pipe 16 and inlet pipe 8, between outlet port 22 and pipe 32, and between outlet port 24 and pipe 38. Thus, the costs of installing and maintaining the filter tank and valve assembly of the present invention are substantially less than similar costs for prior art systems. Moreover, it is customary to dig a pit or erect a housing to shelter the pump and filtration equipment, especially in those regions where freezing temperatures prevail during portions of the year. With the compact arrangement of the device of the present invention, the interior space requirements of such structures may be reduced by a fourth to a third. Obviously, this provides a further substantial reduction in the installation cost of the system.

To operate the device of the present invention, a control rod 40 is mounted concentrically within the valve cylinder 6 and projects through a suitable packing gland 42, or the like, in the upper end 34 of the valve cylinder 6 terminating in a control handle 44. A pair of piston type valve members 46 and 48 are carried by the control rod 40 and are movable, by the control rod 40, between predetermined positions to control the direction of flow of water through the filter bed 4. As seen in FIG. 1, during the filtering cycle, control rod 40 is placed in its upper position, causing valve member 46 to open outlet port 22 and causing valve member 48 to close outlet port 24. Hence, water from pump 14 is delivered through pipe 16 and inlet pipe 8 to the interior of valve cylinder 6 and passes upward and outward through outlet port 20 to the interior of filter tank 2 above filter bed 4. The water then percolates downward through filter bed 4 and passes through ports 18 and 22 of valve cylinder 6 to pipe 32 to be delivered to the swimming pool. The direction of flow of water through the system is indicated by arrows 50.

FIG. 2 illustartes the apparatus of the present invention during the wash cycle, wherein the filter bed 4 is cleaned. As shown, control rod 40 is moved to its lower position for this operation, causing valve member 46 to close outlet port 22 and causing valve member 48 to open outlet port 24. As during the filter cycle, water from pump 14 is delivered by pipe 16 and inlet pipe 8 to the interior of valve cylinder 6. Now, however, the water flows downward, passes through outlet port 18 and is delivered to the interior of filter tank 2 below filter bed 4. The water then passes upwardly through the filter bed 4, agitating the various layers of filtering material to remove foreign matter and to restore the filter bed to its original condition for maximum filtering efficiency. At the top of the filter tank 2, the water passes through ports 20 and 24 of valve cylinder 6 and, thence, to pipe 38 for delivery to the drain or sewer.

FIG. 3 shows the filter cycle position for an alternative form of the filter tank and valve assembly of the present invention. FIG. 4 illustrates the wash cycle position of the device of FIG. 3. In this form of the present invention, control rod 40 of FIG. 1 is replaced by a cylindrical member 52 having closed upper and lower ends 54 and 56, respectively, and being of lesser diameter than the valve cylinder 6. Cylindrical member 52 is movable, in the same manner as control rod 40, by means of a shaft 58 which is connected to the closed upper end 54 of member 52 and passes through packing gland 42, in the upper end 34 of valve cylinder 6, to a control handle 44. Inlet pipe 8 extends through the lower end 28 of valve cylinder 6 and has a permanent, watertight connection therewith which may be made during manufacture of the device by welding or the like. In addition, inlet pipe 8 projects through a suitable packing gland 59 in the lower end 56 of member 52 to deliver water to the interior of member 52, and ports 60 are provided in the member 52 to allow water to flow from the interior of member 52 into the annulus formed between member 52 and valve cylinder 6. Preferably, packing gland 59 will be such as to prevent leakage through end 56 of member 52 about the inlet pipe 8. However, it will be seen that any leakage that does occur at this point will be internal and not result in loss of water from the system. Hence, such leakage is not serious and would not require preventive maintenance. The operation of this form of the invention is substantially identical with that of the device of FIG. 1, as can be seen from the positions of cylindrical member 52 and valve members 46 and 48 and from the arrows 50 representing the direction of flow of water through the system.

It will be obvious that numerous variations and modifications may be made without departing from the invention. Accordingly, it should be clearly understood that the forms of the present invention described above and shown in the figures of the accompanying drawing are illustrative only and are not intended to limit the scope of the invention.

I claim:

1. A filter tank and valve assembly comprising a filter tank, a slide valve cylinder mounted concentrically within said filter tank and secured to said filter tank by permanent leakproof connections, an inlet pipe communicating with the interior of said cylinder projecting to a point exterior of said tank and having a permanent leakproof connection with said tank, a pair of outlet ports formed in said cylinder and communicating with the interior of said filter tank, a second pair of outlet ports formed in said cylinder and communicating with points exterior of said assembly, and piston type valve means movable within said cylinder to control the direction of flow of water through said assembly.

2. A filter tank and valve assembly comprising a filter tank, a filter bed contained within said tank, a slide valve cylinder extending completely through said tank concentric with said tank and secured in place by permanent leakproof connections, an inlet pipe communicating with the interior of said cylinder projecting to a point external of said tank and having a permanent leakproof connection with said tank, a first outlet port formed in said cylinder within said tank and communicating with the interior of said cylinder and the interior of said tank above said filter bed, a second outlet port formed in said cylinder within said tank and communicating with the interior of said cylinder and the interior of said tank below said filter bed, a pair of outlet ports formed in said cylinder external of said tank, and piston type valve means movable within said cylinder to control the direction of flow of water through said assembly.

3. A filter tank and valve assembly comprising a filter tank, a filter bed contained within said tank, a slide valve cylinder extending completely through said tank concentric with said tank secured in place by welded connections between said tank and said cylinder, an inlet pipe communicating with the interior of said cylinder projecting to a point external of said tank and having a welded connection with said tank, a first outlet port formed in said cylinder within said tank and communicating with the interior of said cylinder and the interior of said tank above said filter bed, a second outlet port formed in said cylinder within said tank and communicating with the interior of said cylinder and the interior of said tank below said filter bed, a pair of outlet ports formed in said cylinder external of said tank, and piston type valve means movable within said cylinder to control the direction of flow of water through said assembly.

4. A filter tank and valve assembly comprising a filter tank, a filter bed contained within said tank, a slide valve cylinder extending completely through said tank concentric with said tank secured in place by welded connections between said tank and said valve cylinder, a first outlet port formed in said valve cylinder within said tank communicating with the interior of said valve cylinder and the interior of said tank above said filter bed, a second outlet port formed in said valve cylinder within said tank communicating with the interior of said valve cylinder and the interior of said tank below said filter bed, a pair of outlet ports formed in said valve cylinder external of said tank, a cylindrical valve member movable within said valve cylinder having a diameter less than that of said valve cylinder formed with closed ends and a plurality of apertures communicating with the interior of said valve member and the interior of said valve cylinder, an inlet pipe extending through one end of said valve cylinder and the adjacent end of said valve member having a welded connection with said valve cylinder, and a pair of piston members movable with said valve member to control the direction of flow of water through said assembly.

References Cited by the Examiner
UNITED STATES PATENTS

| | | | |
|---|---|---|---|
| 2,458,893 | 1/1949 | Campbell | 210—288 X |
| 2,459,353 | 1/1949 | Woods | 210—279 |
| 2,564,066 | 8/1951 | Jordan | 210—278 X |

REUBEN FRIEDMAN, *Primary Examiner.*

SAMIH N. ZAHARNA, *Examiner.*